G. C. HENNES.
RAKE CLEANER.
APPLICATION FILED NOV. 14, 1913.
1,093,410.
Patented Apr. 14, 1914.
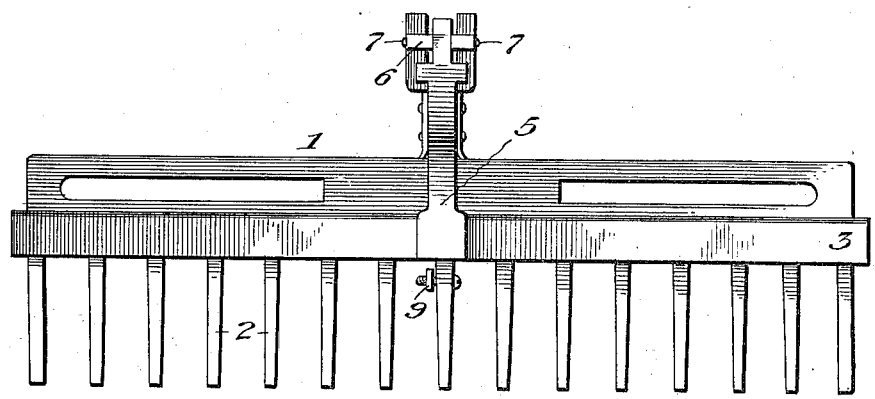
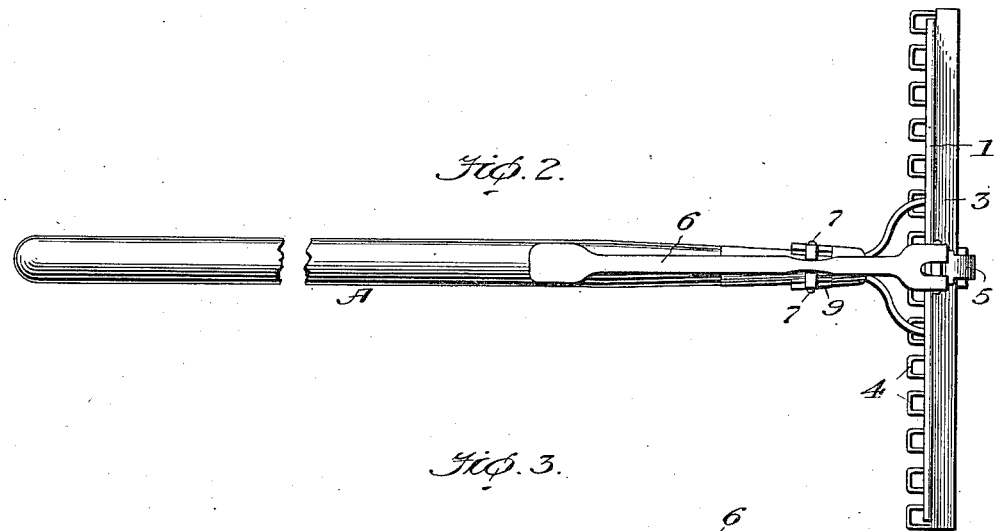
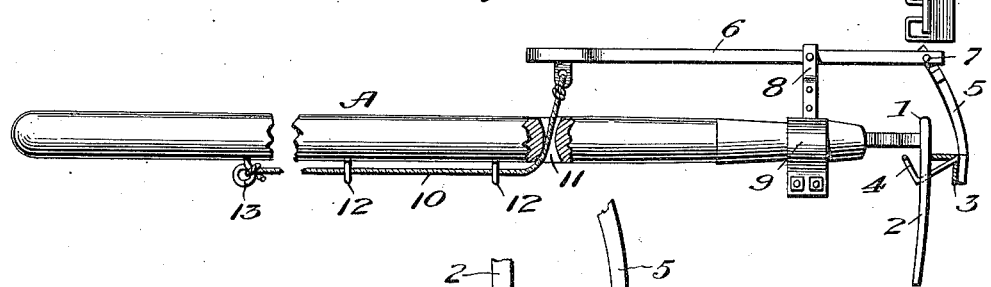
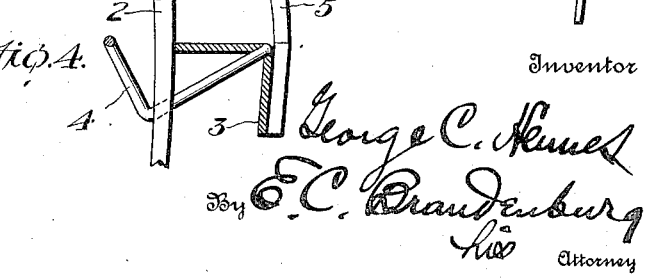

UNITED STATES PATENT OFFICE.

GEORGE C. HENNES, OF BENTON HARBOR, MICHIGAN.

RAKE-CLEANER.

1,093,410.  Specification of Letters Patent.  Patented Apr. 14, 1914.

Application filed November 14, 1913.  Serial No. 801,006.

*To all whom it may concern:*

Be it known that I, GEORGE C. HENNES, a citizen of the United States, residing at Benton Harbor, in the county of Berrien and State of Michigan, have invented certain new and useful Improvements in Rake-Cleaners, of which the following is a specification.

My invention relates to an improvement in rake cleaners, and the object is to provide means for removing any matter clinging to the teeth.

The invention consists of certain novel features of construction and combinations of parts which will be hereinafter described and pointed out in the claims.

In the accompanying drawings: Figure 1 is a view in front elevation; Fig. 2 is a top plan view; and Fig. 3 is a view showing the operating mechanism in elevation and showing the cleaning mechanism and tooth bar in section. Fig. 4 is a detail view of the bar and teeth.

A represents the handle of the rake, to which is connected the rake head 1, which is provided with teeth 2, 2. An angular bar 3 extends parallel with the rake head, and is provided with guards 4, 4. These guards are preferably made of wire and surround the teeth 2, each guard surrounding a tooth. The guards are preferably made right angular, but are so mounted with respect to the bar 3 that they form a V-shaped guard. A curved arm 5 is rigidly connected to the bar 3 and is pivotally connected to a lever 6 by a pin 7, the arm being received between the forked ends of the lever.

A post 8 is mounted upon the rake handle A by means of clamps 9. A bifurcation is formed in the end of the post 8 in which bifurcation the lever 6 is received and pivotally connected to the post. Flexible means, such as a cord or wire, 10, is connected to the end of the lever 6, and passes through an orifice 11 in the handle A, and then through guides 12, 12 to a position accessible by the hand of the operator, a hook 13 being provided for fastening the flexible means for holding the cleaning bar parallel with the head 1 of the rake when not in use.

When any foreign matter, such as grass, branches, or the like, cling to the brake teeth, the flexible means is released, and the bar 3 will fall by gravity, causing the guards to release any foreign matter engaging the teeth. After the teeth have been cleaned, the bar is again raised to a level or parallel with the head 1, and fastened into position, so that the rake is again ready for use.

Having fully described my invention, what I claim as new and desire to secure by Letters Patent is:

1. In a rake cleaner, the combination with a rake handle, and a rake head having teeth, of a bar having V-shaped guards connected thereto, the guards located adjacent to the teeth of the rake handle, and means for normally holding the bar at the upper ends of the teeth, said bar, when released, adapted to fall by gravity for causing the apexes of the guards to engage and be wedged into the foreign matter clinging to the teeth for separating the foreign matter to cause it to be removed from the teeth.

2. In a rake cleaner, the combination with a rake head having teeth thereon, of a bar located normally at the upper ends of the teeth of the head, V-shaped guards connected to the bar and extending along the sides of the teeth, and means whereby said bar is allowed to travel along said teeth for causing the apexes of the guards to engage and be wedged into the foreign matter clinging to the teeth for separating the foreign matter to cause it to be removed from the teeth.

3. The combination with a rake handle, a head having teeth thereon, of a right angular bar, one edge of which is adapted to engage an outer surface of the teeth, wire guards made in the form of a right angle connected to said angular bar, and a guard extending about each tooth of the rake head, said bar adapted to fall by gravity for causing the teeth to be cleaned by the guards, a lever pivotally connected to said bar, and means for normally holding the bar in a position whereby the guards will be at the upper ends of the teeth.

In testimony whereof I affix my signature, in the presence of two witnesses.

GEORGE C. HENNES.

Witnesses:
 GERALD R. MCDOWELL,
 JOSEPH R. COLLIER, Jr.

---

Copies of this patent may be obtained for five cents each, by addressing the "Commissioner of Patents, Washington, D. C."